Patented Sept. 12, 1939

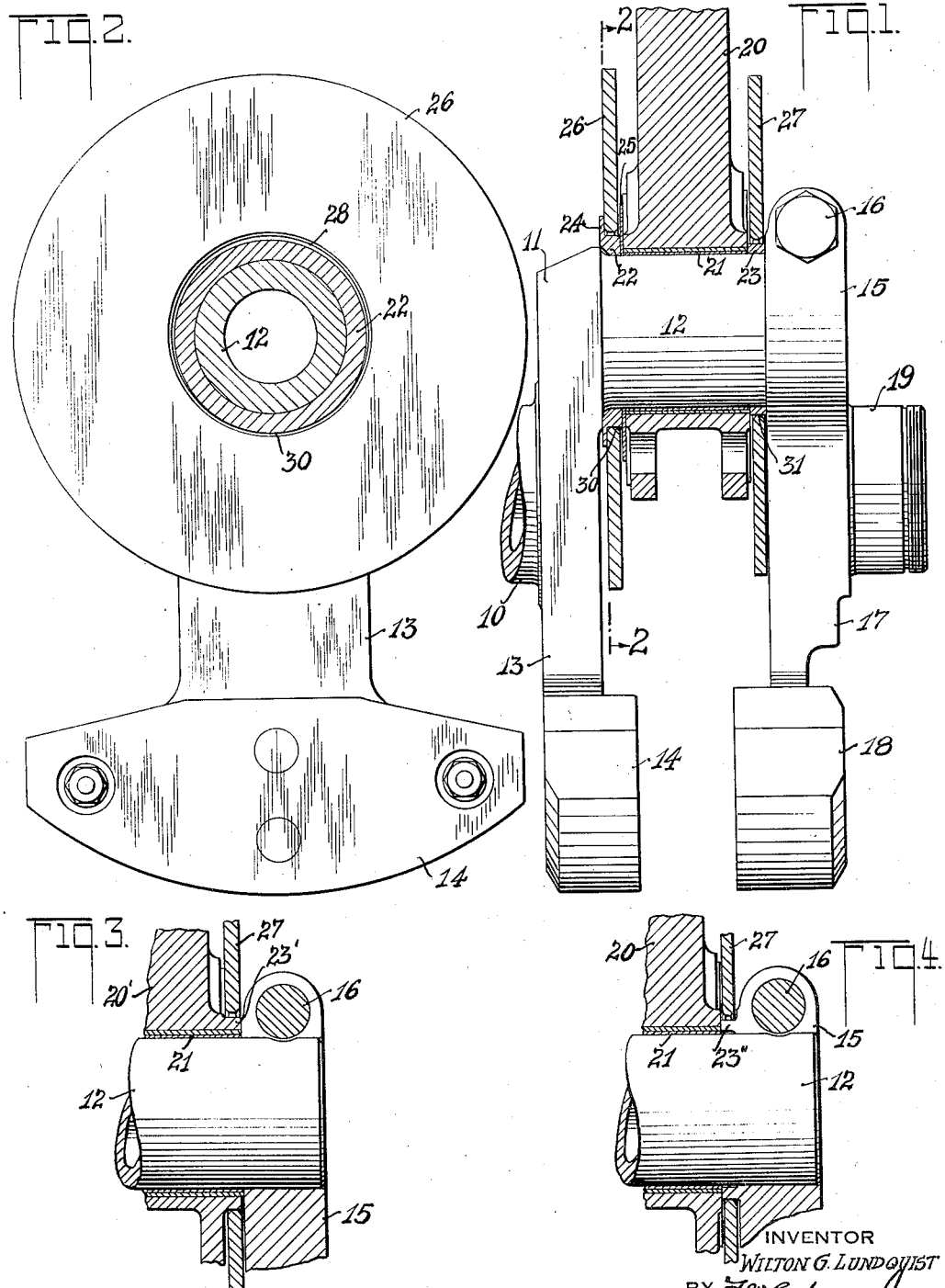

2,172,741

UNITED STATES PATENT OFFICE 2,172,741

CRANKSHAFT TORSION DAMPER

Wilton G. Lundquist, Glen Rock, N. J., assignor to Wright Aeronautical Corporation, a corporation of New York Application June 3, 1938, Serial No. 211,516

6 Claims. (Cl. 74—604)

This invention relates to torsional vibration dampers for engine crankshafts, being adapted for use on either single or multi-throw shafts, and having operational characteristics which compensate torsional impulses imposed on the crankpin, at the crankpin, so that stress fluctuation in the crankshaft per se is minimized.

The invention is based generally on the principles outlined in Chilton Patent No. 2,112,984, and Chilton patent application Serial No. 41,541, filed September 21, 1935, but the physical disposition of the parts herein procure certain advantages not developing from said prior disclosures.

In internal combustion engines, the dominant torsional impulses on the crankshaft are produced from the power strokes of the several pistons and, in the case of a nine-cylinder, four-stroke cycle, radial aircraft engine, the impulses number four and one-half per crankshaft revolution. In the teachings of said prior disclosures, a pendulum counterweight was utilized, wherein the frequency of swing of the pendulum remains constant per crankshaft revolution regardless of rotational speed. The pendulum length may be so arranged that the pendulum frequency is in synchronism with the exciting impulses, wherefor the pendulum swings 180° out of phase with the exciting impulses to thereby balance the torsional impulses and to produce substantially uniform torsional effort upon the crankshaft. In said prior arrangements, the torsional damper was supported on crankcheek extensions on the opposite side from the engine crankpin. Thus, although the torque on the shaft itself became substantially uniform, a considerable stress variation occurred in the crankpin and crankcheek portions of the assembly.

It is an object of this invention to so locate a pendulous torsional vibration damper that the torsional vibration is suppressed substantially at its point of application—namely, the crankpin—whereby stress fluctuation in the crankshaft system is substantially eliminated.

A further object is to dispose pendulous torsional vibration dampers on or adjacent the crankpin of a crankshaft.

Still another object is to provide an alternative arrangement in which pendulous torsional vibration dampers are disposed on a connecting rod journaled on a crankpin.

A further object is to provide torsional vibration damping devices, adjacent the crankpin, which are responsive to a plurality of different torsional vibration frequencies to which the shaft system may be subject.

Further objects and advantages will be apparent from a reading of the annexed specification and claims, and from an examination of the accompanying drawing, in which:

Fig. 1 is a side elevation of an engine crankshaft incorporating the features of the invention;

Fig. 2 is a section on the line 2—2 of Fig. 1;

Fig. 3 is a fragmentary section of a crankpin side elevation showing an alternative arrangement of the invention; and Fig. 4 is a view similar to Fig. 3, showing another alternative arrangement.

The figures generally represent a crankshaft system of the type used in radial aircraft engines, wherein 10 represents the power shaft, 11 is an integral crankcheek carrying an intergral crankpin 12, and wherein a crankcheek extension 13 carries a counterweight 14. To the free end of the crankpin 12, a rear crankcheek 15 is clamped in the conventional manner by a bolt 16, the cheek 15 having an extension 17 carrying a counterweight 18. The rear cheek 15 likewise carries an integral journal 19 adapted to be borne in a suitable bearing of the crankcase.

On the crankpin 12 a connecting rod 20 is journaled through a bushing 21. The crankpin itself is slightly longer than is conventional, and at the ends, adjacent the side faces of the connecting rod 20, are carried annular track elements 22 and 23, closely fitting the crankpin. The track elements 22 and 23 may, if desired, be provided with flanges, such as the flange 24 on the track 22, and flat bearing rings 25 may be interposed between the track element and the connecting rod. Embracing the tracks 22 and 23 are annular torsion damping elements 26 and 27, these comprising discs having bores, such as the bore 28 of the element 26, of larger diameter than the exterior diameter of the track 22. The difference in diameter of the track 22 with respect to the bore 28 is so chosen as to permit of rocking contact between the bore surface and the track, and to endow the element 26 (and/or 27) with a natural vibration frequency, per crankshaft revolution, equivalent to the torsional frequencies engendered by the action of the connecting rod on the crankpin. The discs 26 and 27 will thus act as compound pendula, partaking of polar and translational motion during their rocking upon respective tracks. In operation, with the crankshaft rotating at normal speed, the elements 26 and 27 will tend to be thrown outwardly from the crankpin, wherefor they will bear upon their tracks at radially inward points such as 30 and 31. When a torsional impulse is transmitted to the crankpin by the connecting rod, the elements 26 and 27 will lag rotationally, and when the impulse is relieved, centrifugal force will restore the elements 26 and 27 toward a radial position, overrun of the elements past the radial position providing a torsional impulse opposite in phase to that of the original torsional impulse, thus balancing the torsional effort on the crankpin.

In the prior art structures, the torsional vibration dampers were mounted on or formed the crankshaft counterweights, so that their effect was transmitted through the crankcheeks. Thus, although the torsional effort upon the crankshaft was made uniform by the prior structures, there was a continual stress flunctuation in the crankcheek. By locating the torsion dampers on the crankpin according to this invention, there will be little or no stress flunctuation in the crankcheeks since the balancing force afforded by the elements 26 and 27 is applied directly on the crankpin where the initial power impulses are applied.

Fig. 3 shows an alternative arrangement in which the connecting rod 20' is provided with an integral track element 23' upon which the torsional balancing element 27 is rockably mounted. Such an arrangement would be appropriate when radial connecting rod systems of the "true motion" type are utilized, but might be disadvantageous in the conventional rod system due to the constant oscillation thereof on the crankpin resulting from the movement of the rod pistons in the cylinders.

Fig. 4 indicates still another alternative, adapted for general use, in which the track 23" is formed integral with the crankcheek element 15, or, obviously, with the crankcheek elements 11. By constructing the torsional damping elements 26 and 27 as concentric discs, they may rotate with the chankshaft without inducing any tendency to slip at their rocking contact with the track elements 22 and 23. Or, if the elements 26 and 27 be mounted upon a non-rotating connecting rod spool such as 20', the elements 26 and 27 will follow an orbital path without rotation, but will still provide the torsional balancing impulses for which they are installed.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an engine crankshaft system, in combination, a crankshaft including a crankpin, a connecting rod journaled thereon adapted to impose torsional impulses on said pin, a track concentric with the crankpin, and a torsional impulse compensating ring surrounding said track, the difference between the diameter of the track and the inside diameter of the ring being such as to provide a free period of swing of the ring on the track in resonance with the torsional impulses imposed on the crankpin by said connecting rod whereby torsional vibration due to said impulses is compensated at the crankpin before transmission to the crankshaft system.

2. In a crankshaft system in combination, a crankpin, a connecting rod journalled thereon upon which impulses are applied at a finite frequency per shaft revolution, said pin having an arcuate track formed thereon, and an impulse balancing device comprising a member loosely engaging said track for free swinging relative thereto during shaft rotaion for compensating said impulses at the pin prior to transmission to the crankshaft system.

3. In a crankshaft system, in combination, a crankcheek on the shaft, a crankpin thereon having a circumferential track, means journaled on said pin for driving the shaft system, and an annular member having a hole of larger diameter than the track, the member surrounding the pin and engaging said track for free rocking movement thereon in response to torsional impulses imposed on the crankpin.

4. In a crankshaft system, in combination, a crankpin, an annular track concentric therewith, a member having a hole of larger diameter than the track, the member surrounding the pin and engaging said track for free rocking movement thereon in response to torsional impulses imposed on the crankpin, driving means for the shaft system journaled on said crankpin, a crankcheek supporting said pin on the shaft extended beyond the shaft center, and a counterweight on said extension of such size as to counterbalance the annular member and the driving means on said crankpin.

5. In a crankshaft system in combination, a crankpin, a connecting rod journaled thereon, for driving the system, a track concentric with the crankpin, and a torsional vibration damper stabilized by centrifugal force comprising an annular member surrounding the crankpin and rockably contacting said track.

6. In a crankshaft system including a crankpin and a connecting rod journaled thereon for driving the system, a track concentric with the crankpin, formed on the connecting rod, and a torsional vibration damper stabilized by centrifugal force comprising an annular member surrounding the crankpin and rockably contacting said track, said member having an inside diameter greater than the outside diameter of the track with which it is in rocking contact.

WILTON G. LUNDQUIST.